Oct. 22, 1963    L. A. KLEVEN    3,107,950
BEARING
Filed Jan. 4, 1961    2 Sheets-Sheet 1
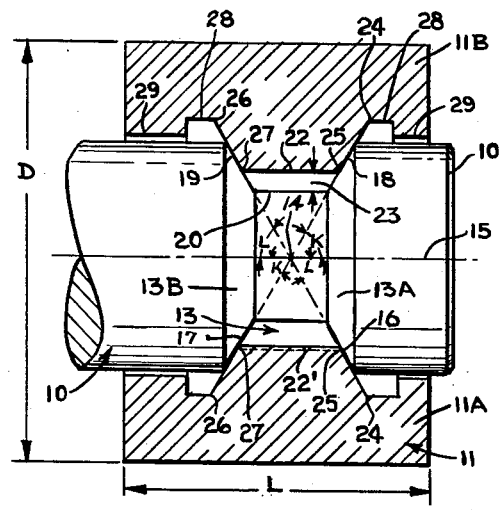
FIG. 1
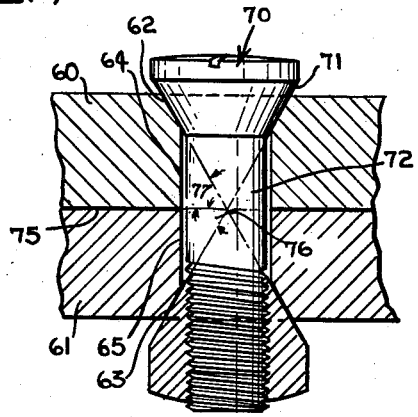
FIG. 3
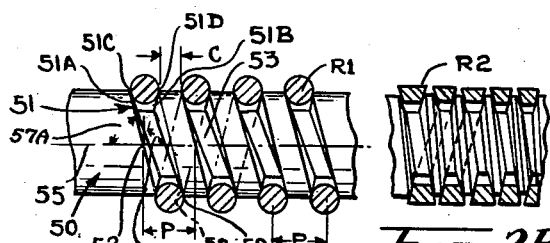
FIG. 2A    FIG. 2B
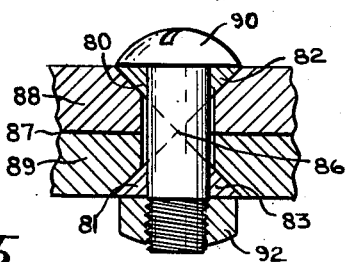
FIG. 4
FIG. 6
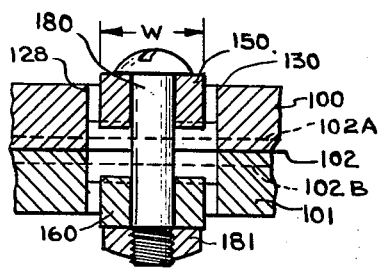
FIG. 5
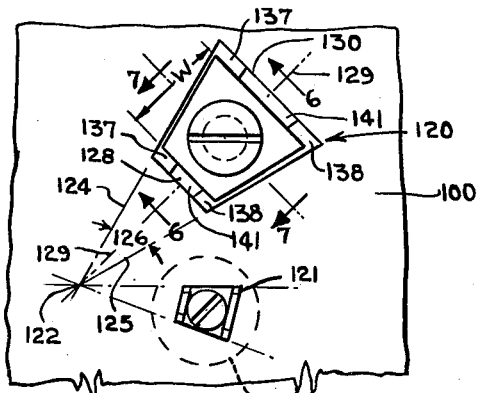
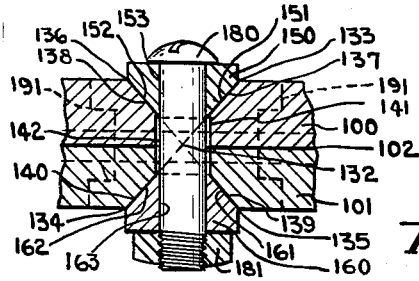
FIG. 7
INVENTOR.
LOWELL A. KLEVEN
BY
Dugger & Johnson
ATTORNEYS Oct. 22, 1963     L. A. KLEVEN     3,107,950
BEARING
Filed Jan. 4, 1961     2 Sheets-Sheet 2
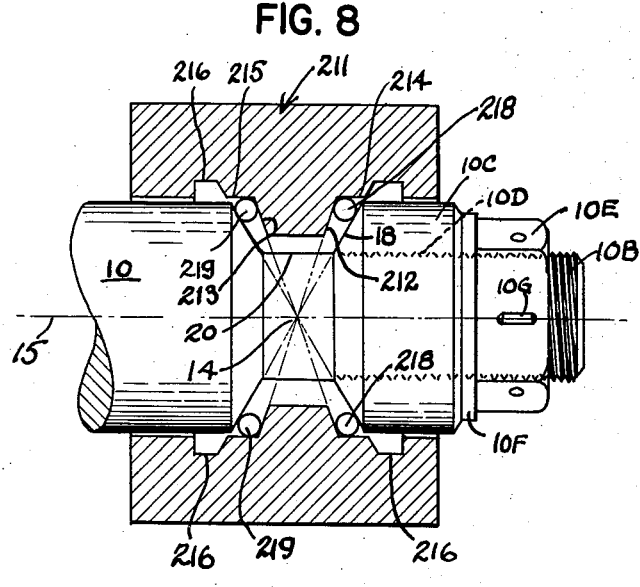
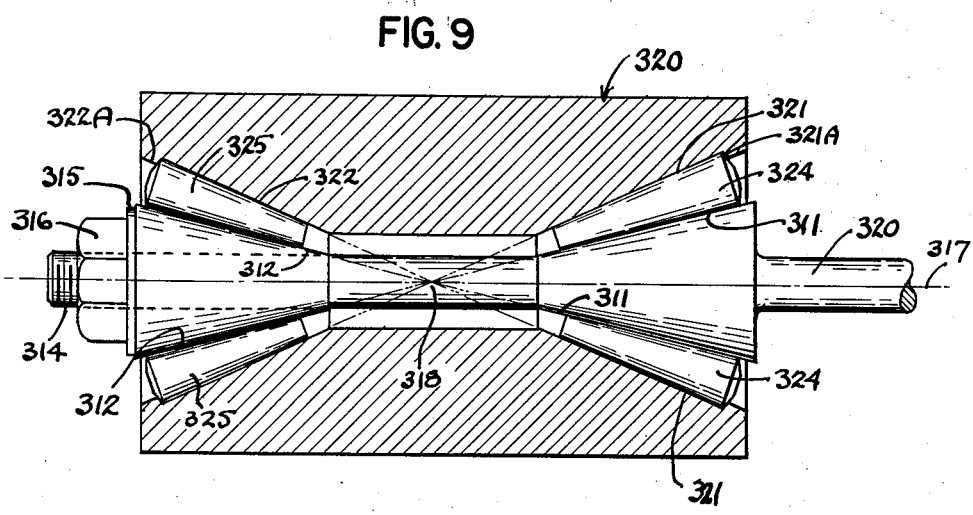
INVENTOR.
LOWELL A. KLEVEN
BY
Dugger & Johnson United States Patent Office                                    3,107,950
                                                        Patented Oct. 22, 1963

3,107,950
BEARING
Lowell A. Kleven, Madison, Minn., assignor to Rosemount Engineering Company, Minneapolis, Minn., a corporation of Minnesota
Filed Jan. 4, 1961, Ser. No. 80,657
10 Claims. (Cl. 308—36)

This invention relates to mechanical structures and particularly to mechanical joints wherein the supporting and supported elements are of materials which have different coefficients of expansion. There are many situations in which the aforesaid characteristics prevail. Thus, in bearings, the shaft, which is the supported structure, might be steel, whereas the bearing which is the supporting structure must be material suitable for bearings, such as babbitt, bronze or some of the rare metals such silver. Another situation is in connection with electrical resistance elements that are used for heat or as resistance elements in electrical circuits. In this situation the supporting component is usually an insulator such as a ceramic material and the supported structure is an electrical resistance wire such as Nichrome, platinum or other electrical resistance materials, the type of element depending upon the use. Likewise in constructions utilizing plastics or wood in association with other materials, expansions and contractions occur due to humidity changes, more especially than due to temperature changes. Again in other situations it is desirable to provide fastenings between structures, where the fastening element is of one material and the fastened element is of another material. In this situation the supporting structure is either the "fastened" or the "fastening" element and the other component is the other one. Sometimes structural components of varying materials are bolted together.

In all of these situations the effect of variation in conditions such as temperature or humidity is to produce a slight but positive working or movement at the area of contact of the supporting and supported components. This is true of the shaft and bearing, the electric resistance element and its support and the fastening and fastened components of varying metals, or plastics and metal or wood and metal, and in any other situations wherein diverse materials are brought into facing or bearing contact with each other and load is transferred. When changes in environmental conditions occur, such as temperature or humidity changes, or both, there is a working or movement of the several components relative to each other which produces stress or looseness and this is undesirable. In respect to bearings, where the shaft passes through a bearing of diverse material, the effect of heating is normally to increase the clearance of the bearing, which is undesirable. It is desirable in many instances to maintain a precise clearance at a bearing so as to provide for precision operation, regardless of the temperature to which the machine is subjected.

Throughout this specification and claims the terminology "mechanical joint" is therefore intended to mean any of the inter-related machine elements of the most diverse kind, whether they be a static support, as for example an electrical resistance support with resistance elements mounted thereon or whether it be a machine element such as a bolt or rivet passing through plates of diverse materials, or a bearing shaft in a bearing or connections between diverse materials.

It is an object of this invention to provide mechanical supports which maintain constant clearance regardless of the changes in environment to which the materials of the structure are subjected. It is another object of the invention to provide an improved mechanical structure wherein a constant holding pressure between the parts is maintained regardless of changes in environmental conditions to which the entire structure is subjected and regardless of diversity of materials as between the supported and supporting element of the structure. It is another object of the invention to provide improved machine bearings. It is another object of the invention to provide an improved electrical resistance and support therefor. It is another object of the invention to provide an improved fastening element. It is a further object of the invention to provide fastening elements which may be used for attaching together machine elements having coefficients of expansion which differ under the environmental conditions of temperature, humidity, etc., to which they are exposed.

Other and further objects are those inherent in the invention herein illustrated, described and claimed and will be apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein corresponding numerals refer to the same elements and in which FIGURE 1 is a vertical sectional view through a machine shaft and bearing therefor.

FIGURES 2A and 2B are vertical sectional views showing two exemplary forms of resistance elements and supports therefor embodying the present invention.

FIGURES 3 and 4 are respectively vertical sectional views through two exemplary forms of bolt fastening devices embodying the invention.

FIGURE 5 is a plan view of a modified form of the invention wherein two plates of diverse material are bolted together. FIGURE 6 is a vertical sectional view taken along the line and in the direction of arrows 6—6 of FIGURE 5.

FIGURE 7 is a vertical sectional view taken along the line and in the direction of arrows 7—7 of FIGURE 5.

FIGURES 8 and 9 are vertical sectional views of other forms of bearings utilizing the principles of the invention.

In the explanation of the invention in the specification which follows, variations in expansion are frequently exemplified as being due to variations in the thermal coefficients of the diverse materials used, since this is a frequent reason such variations in mechanisms and static devices occur. However, variations in expansion are many times also due to other causes such as humidity, and it is therefore to be understood that this invention is therefore applicable to all situations wherein diverse materials in the same device expand or contract at different rates when subjected to changes in the environment to which they are subjected, and that the term environment where used herein is intended to be inclusive of all conditions such as temperature, humidity, etc., which, in respect to the materials in the device, will cause them to expand and contract at different rates.

Referring to the drawings, FIGURE 1 exemplifies a form of pillow-block bearing embodying the invention, and in which shaft 10 is rotatable in the journal bearing 11. The bearing 11 is a unitary structure having portions 11A and 11B, which are parts of a split "block" fastened together by bolts or other fastenings not shown. The bearing 11 is composed of a material which is different than the material used in the shaft 10, and it has a thermal coefficient of expansion which is slightly different than the thermal coefficient of expansion of the material of the shaft, otherwise binding would occur.

The shaft 10 is provided with a bearing groove generally designated 13 which has the sidewalls 13A and 13B and bottom 20. These sidewalls are generated as frustroconical surfaces (as viewed in section), the apex of the frustroconical surfaces being the point 14, which is on the centerline 15 of the shaft 10. The frustroconical surfaces have imaginary apexes at 14, and the frustroconical surfaces are "opposed," that is to say they face in opposite directions (and have a common apex point). It will be appreciated from FIGURE 1 that if a vertical plane were passed through the shaft 10 it would intersect the frustroconical surfaces on the lines 16—17 and on the lines 18—19. These two lines 16—17 and 18—19 cross at the "apex" point 14 which is on the center line of the shaft 10. From another viewpoint one might consider the shaft bearing surfaces as being formed as a surface of revolution of the lines 16, 17 and 18, 19 around the axis 15 of the shaft, holding point 14 constant as an intersection between these lines and with the surface terminated at base line 20, which forms the bottom of the shaft groove 13. Also that the line 16—19 should be at a constant angle L with reference to the centerline 15 throughout the surface of revolution and the line 17—19 should be at a constant angle K with reference to centerline 15 throughout the surface of revolution. The lines 16—19 and 17—18 should have a common meeting point at the point 14, but angles K and L need not be the same size angles, but can be and commonly are, for convenience, made the same size.

The groove 13 is formed with a bottom surface 20 and enough material is left in the shaft so that it is strong enough for the purpose intended. The shaft may continue on in both directions from the bearing 11 or it can be a cut-off as at 10A, or it may be extended for purposes of taking a coupling, etc.

The bearing 11 has a minimum diameter bore at 22, and it is provided with frustroconical surfaces (or surfaces of revolution, however, designated) which exactly match in size and dimension the corresponding surfaces of the groove 13 in shaft 10 except for bearing clearance and except that the line 22 (which is the minimum diameter of the bearing) always provides a clearance 23 to the line 20 of the shaft. These surfaces need not be planar but may be any shape, such as ball bearing surfaces. The bearing 11 is, of course, split into two or more pieces axially so as to allow it to be put on the shaft. Assembly bolts not shown hold all bearing segments together. Bearing 11 is provided with lubrication means, as required. Unlike an ordinary sleeve bearing, the bearing of this invention will take axial loads.

The thus formed surfaces of bearing 11 extend (in the sectional view) from 25 to 24 and from 27 to 26. At the diameter of 24 and 26 the bore, if desired, may be continued right out to the ends of the bearing with clearance around the shaft at the diameter of surfaces 28—28 or again reduced to diameter 29 at each end which allows clearance so as not to touch the shaft but affords some protection from dust and dirt. The design of the bearing beyond the frustroconical surfaces 24—25 and 26—27 can be as desired and may include grease seals, slinger rings, etc. as desired. Any suitable support for the bearing is made in the machine in which it is used and, as previously stated, the bearing can be split into two or more segments by a plane or planes passing through centerline 15. The bearing support holds the bearing segments together into one whole. The surfaces of revolution 24—25 and 26—27 of the bearing (which are also frustroconical about axis 15 with common apexes at 14) thus provide a land which has a minimum width at 22 between reference locations 25 and 27 and a maximum width between reference locations 24 and 26, measured in an axial direction. The frustroconical surfaces of the bearing 11 are, of course, made so as to provide just a little clearance where these surfaces contact the corresponding surfaces of the shaft 10.

The attributes of his arrangement provide the unexpected result that if the dimensions of the shaft and the dimensions of the bearing increase or decrease unequal amounts, as may occur when the bearing and shaft (having differing thermal coefficients of expansion) are subjected to a change in environment (i.e. commonly, a change in temperature) the clearance between the surfaces of the shaft and the cooperating mating surfaces of the bearing will not change. Thus, if one assumes that the temperature increases, and assumes further that the bearing material expands faster than the shaft material (for a given amount of temperature change), there would in effect be an increase of dimension of the bearing in the direction of its length axially and a corresponding increase in dimension in diameter. Furthermore, all portions of the bearing would increase proportionally but at a different rate than the shaft, and consequently the line 22 which forms the minimum diameter of the bearing would in effect be increased as shown at the dotted line 22'. The increased axial dimension of the bearing at 22' will be more than the corresponding increase in axial dimension of the shaft (which has an assumed, lower thermal coefficient of expansion than that of the shaft). Hence the increase in dimension at 22' must be accommodated without decrease in bearing clearance. Fortunately, according to this invention, and because of the shaping of the bearing surfaces as described, this will occur because of the corresponding increase in diameter of the bearing at the line 25—27. The bearing surfaces simply ride out a little further radially in the shaft groove. Consequently the bearing will maintain a precise clearance relative to the shaft regardless of the change of temperature. This is true because the surfaces of the bearing and of the shaft are generated as shown in FIGURE 1 with the apexes of the frustrocones at a common point 14 on the axis of the shaft.

FIGURE 1 exemplifies a form of pillow-block bearing, that is to say, one in which the shaft surface slides with reference to the bearing surface, being separated only by the lubricating film. The invention is also applicable to other bearing forms using ball or tapered roller bearings. FIGURE 8 shows the invention using ball bearings and FIGURE 9 shows the invention using tapered roller bearings.

In FIGURE 8 the shaft 10 is constructed as described except that the conical surface 18 is made removable, as a collar 10C. The shaft at diameter 20 is continued to the right end as at 10B (as shown in FIGURE 8) and is threaded at 10D. The cone 10C is also threaded so that during assembly it can be turned down until the bearing is adjusted after which the washer 10E and lock nut 10F are placed and tightened and locked by split-key 10G. The bearing 211 is similar to bearing 11 of FIGURE 1 but the frustroconical surfaces 212 and 213 are generated about lines which intersect a point 14 and each has a constant angle relative centerline 15 as in FIGURE 1. These frustroconical surfaces each include a step 214 (for surface 212) and 215 for 213, and these surfaces then continue as shown, similar to FIGURE 1, for finishing the bearing. Cone 10C is adjusted so that the apex of surface 18 is at point 14, and coincides with the apex of cone 19 at this same point. Grease seals, etc. may be provided as desired. The surfaces 212—214 and 213—215, form races to receive sets 218 and 219 of ball bearings which roll on the frustroconical surfaces 18 and 19 respectively. This bearing can be designed for zero clearance and preloaded, if desired. Assuming a different coefficient of expansion for the material in the bearing 211 and balls 218 and 219 as compared to the expansion for the material of the shaft 10, if then a temperature change should occur, the ball bearings will simply track at a different place on the conical surfaces 18 and 19.

In FIGURE 9 there is illustrated a form of bearing of the tapered roller type constructed in accordance with the principles of this invention. Here the shaft 310 has two conical elements 311 and 312 thereon. Surface 312 is made separate and can be threaded onto the threaded end 314 and held in place by lock washer 315 and nut 316, similar to FIGURE 8. Each of the conical surfaces are generated and located so as to be frustroconical surfaces of revolution about axis 317 of shaft 310, having a common apex at 318. The bearing 320 likewise has frustroconical bearing surfaces of a slightly greater included angle than the cones 311 and 314, these being the frustroconical bearing races 321 and 322, which likewise have a common apex at 318 on the shaft axis 317. These surfaces have steps 321A and 322A to hold the conical rollers from endwise movement. The conical rollers in sets 324 and 325 seat on surfaces 321—321A and 322—322A and respectively fill the spaces between conical surfaces 311 and 321 and between 314 and 322. The rollers may be distributed by races, not shown. The conical surface 312 is adjusted to bring its apex to 318 and thus coincide with the apex of cone 311. This bearing can be designed for zero clearance and preloaded, if desired.

The bearing structure operates similar to that shown in FIGURE 8.

Referring to FIGURES 2A and 2B there are illustrated two exemplary forms of electrical resistance supports and the resistances thereon. In FIGURE 2 there is a support 50 which may, for example, be of insulating material such as ceramic material. The support 50 has a spiral groove formed therein at 51, this groove being such that a full turn produces the pitch P between the points 52 and 53. These points may be brought closer together, until the clearance at dimension C is reduced to a minimum permissible amount. In this drawing the same clearance C is provided as one-half of the pitch P but one must regard the amount of clearance C, as being an amount that can be adjusted as desired. The side-walls 51A and 51B of the groove are each generated by revolving a line around the center line 55 of the cylindrical support 50. The extension of the lines denoting the surfaces 51A and 51B meet at the point 52 on the center line 55. Furthermore, the angle 57A between the line 51A and the centerline 55 is constant and the angle 57B between line 51B and centerline 55 is constant. These angles 57A and 57B have apexes on centerline 55. Angles 57A and 57B need not be equal, but for manufacturing convenience are preferably equal. The intersection of the lines 51A and 51B at the surface of the cylindrical support 50 is at the points 51C and 51D, and these points are points on parallel spiral lines. These spiral lines defined as the locii of all points 51C and 51D are parallel and define the width of the groove at the surface of the cylindrical support. It is as though a pair of parallel spiral lines were drawn on the insulator and the turns spaced so that one turn does not overlap another turn. The pitch P need not be constant but for convenience in manufacturing, it is preferably constant. With these parallel lines, the surfaces 51A and 51B are then generated by revolving around the axis of the cylinder a pair of lines which intersect at the axis 55 and each line always has a certain angle with reference to the axis. The groove 51 so formed is quite similar to the "Acme" form of thread, used on machinery with this difference, that the groove sidewalls, if extended in depth, would intersect at the axis of the support.

The electrical resistance which is used in the groove is a wire of uniform, preferably circular cross section throughout the length of the resistor, the resistor being wound on a spiral so that the spiral nests in the groove formed in the insulator. A wire of frustroconical cross-section such as a shape as defined by corners 24—25—27—26 of FIGURE 1, could be used, but for manufacturing convenience and least cost, a wire of circular cross-section is normally preferred. In FIGURE 2A the cross-section of the resistance element is circular whereas in FIGURE 2B it is polygonal. In FIGURE 2A the diameter of the resistor R1 is such that it will seat within the groove or "thread" formed in the insulator but without resting on the bottom of the groove. In FIGURE 2B the cross-section is made something like that of a V-belt so that the sides of the resistor element has the same angularity as the groove and will rest in the groove without touching the bottom.

The effect of this arrangement is as follows: If the insulator and resistor are subjected to a change of temperature and assuming that they have different coefficients of expansion and the temperature increases, these elements, namely the support 50 and the resistor R1 or R2, will "grow" at different rates. However, the growth is proportional in all directions and the result is that the point (or line) of contact of, for example, the resistor R1 which in one condition might have been at the level 58, in another higher temperature condition would seat at a level farther up in the groove at 59. Thus for temperature changes the contact between the resistor elements R1 or R2 and the insulating support always remains but the two elements will seat lower or higher in the groove 51, depending upon the particular temperatures involved. It will be noted that in this design, as in FIGURE 1, the lines which generate the sides of the groove always intersect at the center line of the object, which is to say, the center line 55 of the insulator in FIGURES 2A and 2B. In FIGURE 1 the lines intersected at a common point 14 of the centerline 15, whereas in FIGURES 2A and 2B the point of intersection shifts along the centerline because of the spiral configuration of the groove, but the intersection is always on the centerline. The action is the same as in FIGURE 1, so long as the pitch of the spiral remains relatively small, as shown.

In FIGURE 3 there is illustrated a bolt fastening for several members 60 and 61, which can be of the same or diverse materials. The fastening 70 is illustrated as a bolt but it will be understood that it can be a fastening of any kind which has two heads, one on each end, for holding two objects together. Thus it may be a rivet or the like. The characteristic of the fastening is that the underside of the head is provided with a frustroconical surface 71 whereas the underside of the nut is provided with a similar frustroconical surface 72. Two corresponding cooperating frustroconical surfaces are also formed at 62 for the plate 60 and at 63 for the plate 61. It is noted that the shank 72 of the bolt is somewhat smaller than the holes 64 and 65 in the plate 60 and 61 respectively.

The bolt 70 is put in place and the nut 72 is screwed down (or if it is a rivet the head is set). This brings the frustroconical underside portion 71 against the frustroconical portion 62 of the plate 60 and the frustroconical underside portion 72 of the nut against the surface 63 of the plate 61. Notice that all frustroconical surfaces of the bolt (head and nut) and also of the plates 60 and 61 have a common apex at 76, which is a point in the plane 75, forming the contacting surfaces between the elements 60 and 61 which are fastened together. These angles 76 and 77 between the plane 75 (of contact of elements 60 and 61) and the frustroconical surfaces 62 and 63 can be any size desired so long as they are equal and opposite and so long as the apexes of the frustroconical surfaces are one point 76 in the plane 75. The hole 64—65 to the two plates is always made large enough so as to provide a little clearance for the shank of the bolt 72.

The net effect of this construction is that regardless of changes of temperature of the plates 60—61 and the bolt 70—72, uniform pressure will be generated between the frustroconical surfaces of the bolt and the adjacent similarly formed surfaces of the plate, even though the elements expand or contract different amounts. In this arrangement the bolt-nut 70—72 need not be the same as the same materials of the plates 60—61 and also the plate 60 and 61 can be different materials, provided only one such bolt-nut 70—72 is used for holding them together.

In FIGURE 4 the arrangement is the same as in FIGURE 3 except that the frustroconical portion of the bolt-nut arrangement are made as separate collars 80 and 81, these collars having frustroconical surfaces 82 for the collar 80 and 83 for the collar 81, the apexes of which are at the point 86 on the plane 87 which forms the boundary between the two elements 88 and 89 being held together. The form of the bolt-nut 90—92 can be any ordinary nut as shown, or any other formation which is suitable for the purposes, and the bolt-nut 90—92 is made of the same material as that of which the frustroconical elements 80 and 81 are made.

The result of this arrangement is exactly the same as in FIGURE 3, already described.

In FIGURES 5, 6 and 7 there is shown a fastening involving several plate elements 100 and 101 which are of different materials, that are bolted together by a plurality of bolts. It will be appreciated that if two plates of diverse materials having different coefficients of expansion are fastened together, so as to be immovable with reference to each other, that any temperature change imposed on the composite will cause the two plates to expand at differing rates, and will cause warpage to dish the element. A familiar form of bi-metal component operates in this manner. In order to prevent such warping of the materials due to temperature changes it is essential that the two plates of different coefficients of expansion be permitted to "work" relative to each other. In other words, one plate must slide freely on the other as the temperature changes, otherwise a rotational moment will be imposed upon material and will cause it to warp and dish. The bolting together of several plates of diverse material is therefore fraught with difficulty, because the fastenings must permit the aforesaid "working" which occurs due to changes in temperature.

According to the present invention this difficulty is overcome by providing a plurality of fastenings as shown in FIGURES 5, 6 and 7 all located as illustrated at 120 and 121 in FIGURES 5, 6 and 7. All fastenings, of which two (i.e. 120 and 121 are shown) are located around an imaginary center 122 which can be on or off of the area of the plates 100—101 being fastened together. Giving attention to FIGURE 5, each of the locations of fastening 120 and 121 and regardless of its size, is generated as an opening between a pair of radial lines 124 and 125 which intersect at the center 122. These radial lines diverge outwardly at a constant angle 126, and at a certain place they are intersected by a cross-line 128, which is at right angles to the center line 129, which is a bi-sector of the angle 126. Farther out again the aperture, through which the fastening passes, is bounded by the line 130. The lines 124, 128, 125 and 130 therefore define a fastening location or area and an aperture is provided through each plate 100 and 101 within the confines of such area.

Referring to FIGURES 6 and 7, the boundary line 102 between the two plates 100 and 101 may just as well be any line as at 102A or 102B, but wherever it is, it establishes the plane through which pass planes defining the aperture surfaces of the fastening location. Thus viewed as in FIGURE 7, which is a section along lines 7—7 of FIGURE 5, the plane 102 has in it a point 132 through which will pass the plane and line 133—134. Similarly the plane and line 135—136 passes through the point 132. These two lines 133—134 and 135—136 (as shown in FIGURE 7) illustrate the angularly disposed planar surfaces at 137 and 138 of plate 100 and the similar angularly disposed surfaces 139 and 140 of plate 101. These angularly disposed surfaces slant down into the plate 100 (similar for plate 101) until intersecting slot at 141 for plate 100 (and matching slot at 142 for plate 101). It will be appreciated that this slot 141—142 is wider adjacent the terminal boundary 130 (see FIGURE 5) than it is at boundary 128, but the characteristics of the formation is the same. When viewed in the transverse section 6—6, as in FIGURE 6 (and regardless of where along the slot the section is taken) the slant surfaces 137 and 138 (also 139 and 140) would, if extended, intersect at the plane 102 as at 132.

The fastener is composed of two bars 150 for plate 100 and 160 for plate 101, each of which reaches across the slot, preferably but not necessarily normal to line 129. Thus, bar 150 reaches across from surface 137 to surface 138 and the bar 150 has its under surfaces 151 and 152 shaped to match the slant of surfaces 137 and 138 respectively of the slot in plate 100. Similarly there is another bar 160 on the opposite side, for plate 101, and it has a slanting surface 161 which mates against the surface 139 of the plate 101 and a slanting surface 162 which mates against the slanting surface 140 of the plate 101. These two bars 150 and 160 are similar and they have in them aligned apertures as at 153 and 163, and through the apertures is passed a bolt 180, which is provided with a nut 181, and both nut and bolt are made of the same material as the bars 150 and 160.

The bars are made of a width W as shown in FIGURE 5 and FIGURE 6 such that a little clearance is provided between the bars (150 and 160) and the boundaries 128 and 130 and hence there is clearance for the bars to slide a little along the slots in the direction of the dimension W.

All of the fastenings that are used between the plates 100 and 101 are made in this fashion. If desired the fastening locations in the plates composed of slanting surfaces and apertures can be made as factory-fabricated inserts as shown by the dotted line 190, for the fastening 121 of FIGURE 5. Thus the inserts may be fashioned separately and simply pressed into a suitable shaped aperture in the plate 100 as shown at 190 in FIGURE 5 and in dotted lines 191 in FIGURE 7. This is a manufacturing convenience.

The result of this arrangement is that even though temperature changes are imposed upon the plates 100 and 101 and upon fastenings 120—121, the fastenings will maintain a uniform holding pressure against the plates, and will not be loosened. The fastenings will slide a little in their respective apertures as previously explained so as to take up the change in dimension occasioned by the varying expansions of the materials.

As many apparently widely different embodiments of this invention may be made without departing from the spirit and scope thereof, it is to be understood that I do not limit myself to the specific embodiments herein.

What I claim is:

1. A device comprising a first body having opposed outer surface portions thereof, said body being of a material which expands and contracts under influence of certain changes of environment, said body having an outwardly facing intaglio support indentations in opposed outer surface portions, each of said indentations having opposed outwardly sloping sidewalls, said sidewalls being defined by lines passing through a point in the first body and intersecting periphery lines on the surface portions of the body defining the periphery of the indentations, and a second body composed of a different material which expands and contracts at a different rate under influence of the same changes of environment, said second body having integral portions shaped so as simultaneously to engage in journal relationship in respect to the opposed sidewalls of the indentations of the first body so as to be supported thereby, said second body being so shaped as to remain out of contact with the other portions of said first body which would obstruct movement of said opposed sloping sidewalls.

2. The device specified in claim 1 further characterized in that the first body is cylindrical and is rotatable relative to the second body and said opposed outer surface portions of the first body constitute opposed portions of a continuous groove encircling the first body, said opposed sloping sidewalls being opposed frustroconical surfaces having a common apex on the axis of the cylinder.

3. The device of claim 1 further characterized in that the periphery lines include divergent straight portions which intersect at an imaginary point of intersection on said first body.

4. The device of claim 3 further characterized in that first body is composed of a through fastening and the portions shaped so as to cooperate with the opposed sidewalls which are made as collars, one of which is removable from said through fastening.

5. A machine bearing comprising a frame of a material having a certain rate of expansion having a journal bearing thereon, a shaft having another rate of expansion mounted for rotation in said journal bearing, the portions of the shaft which rotates in the journal bearing being provided with a groove having a bottom and outwardly diverging opposed frustroconical sidewalls having a common apex at a point on the axis of the shaft, said journal bearing having opposed lands fitted to engage the sidewalls but to be clear of the bottom of the groove.

6. A machine bearing comprising a stationary journal bearing of a material having a certain coefficient of expansion, a shaft of a material having a different coefficient of expansion, said shaft and journal bearing each having a pair of opposed spaced, right-frustoconical surfaces generated about a point on the axis of the shaft, said frustoconical surfaces of the shaft and said pair of frustoconical surfaces of the journal bearing being cooperative journal bearing surfaces.

7. The machine bearing specified in claim 6 further characterized in that said pair of frustoconical surfaces of the shaft revolve in bearing relationship directly in the pair of frustoconical surfaces of the journal bearing and are separated therefrom only by bearing clearance.

8. The machine bearing specified in claim 6 further characterized in that said pairs of frustoconical surfaces of said journal bearing and shaft respectively are separated sufficiently to receive a plurality of rolling bearing elements between them.

9. The machine bearing specified in claim 8 further characterized in that the rolling bearing elements are balls.

10. The machine bearing specified in claim 8 further characterized in that the rolling bearing elements are tapered rollers.

References Cited in the file of this patent
UNITED STATES PATENTS
2,590,761     Edgar ---------------- Mar. 25, 1952